United States Patent
Bradford

[11] Patent Number: 5,169,164
[45] Date of Patent: Dec. 8, 1992

[54] COOLER TOTE

[76] Inventor: Michael A. Bradford, 3931 Hillman Rd. East, Columbus, Ohio 43207

[21] Appl. No.: 641,048

[22] Filed: Jan. 14, 1991

[51] Int. Cl.⁵ ............................................. B62B 1/20
[52] U.S. Cl. ................................. 280/35; 190/18 A; 280/47.26; 280/63; 280/47.131
[58] Field of Search ..................... 280/35, 47.131, 638, 280/645, 652, 47.17, 47.24, 47.26, 63; 62/457.1, 457.7; 190/18 A, 26

[56] References Cited

U.S. PATENT DOCUMENTS

| | | | |
|---|---|---|---|
| 1,788,150 | 1/1931 | Curtin | 280/35 |
| 2,132,316 | 10/1938 | Newton | 280/35 |
| 2,375,338 | 5/1945 | Alexander | 280/61 |
| 2,670,969 | 3/1954 | Costikyan | 280/47.131 |
| 2,696,990 | 12/1954 | Davis | 280/47.13 |
| 2,723,535 | 11/1955 | Jones | 62/457.7 |
| 2,919,138 | 12/1959 | Brower et al. | 280/35 |
| 3,539,194 | 11/1970 | Stiles | 280/47.13 |
| 3,754,773 | 8/1973 | Bruno | 280/47.131 |
| 3,891,245 | 6/1975 | Elsas | 280/47.131 |
| 3,963,256 | 6/1976 | Stafford | 280/35 |
| 4,724,681 | 2/1988 | Bartholomew et al. | 62/239 |
| 4,846,493 | 6/1989 | Mason | 280/641 |
| 4,873,841 | 10/1989 | Bradshaw et al. | 62/239 |

FOREIGN PATENT DOCUMENTS 205413  9/1959  Austria .................................. 280/35

Primary Examiner—David M. Mitchell
Assistant Examiner—Michael Mar
Attorney, Agent, or Firm—Watkins, Dunbar & Pollick

[57] ABSTRACT

A cooler tote that is easily attached and removed from a picnic cooler permitting easy wheeling of the cooler to its destination and thereby eliminating the need for carrying. The tote consists of a wheeled support to support the cooler and to which are attached straps that are secured lengthwise around the bottom, ends, and top of the cooler. Large wheels provide mobility over rough terrain. Angled supported brackets and cross straps prevent the cooler from repositioning or disengaging itself from the tote. A handle provides a convenient way of pulling the cooler.

23 Claims, 3 Drawing Sheets

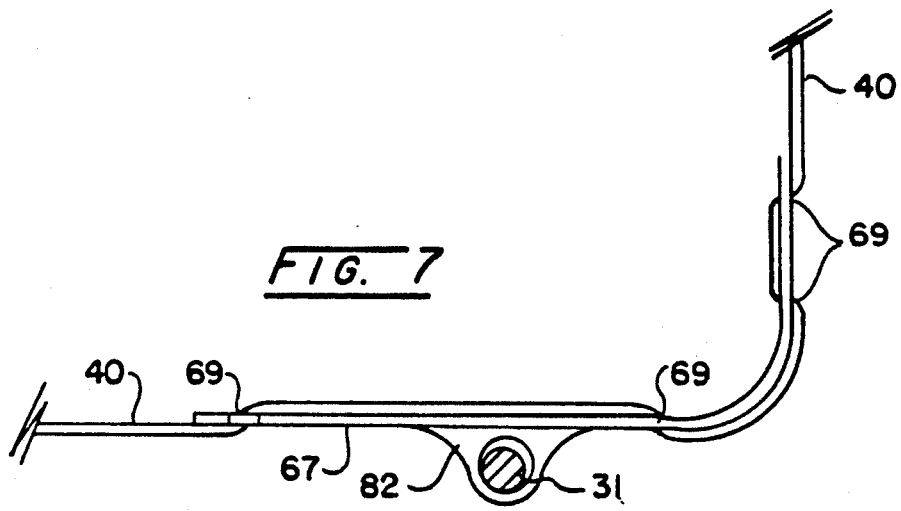
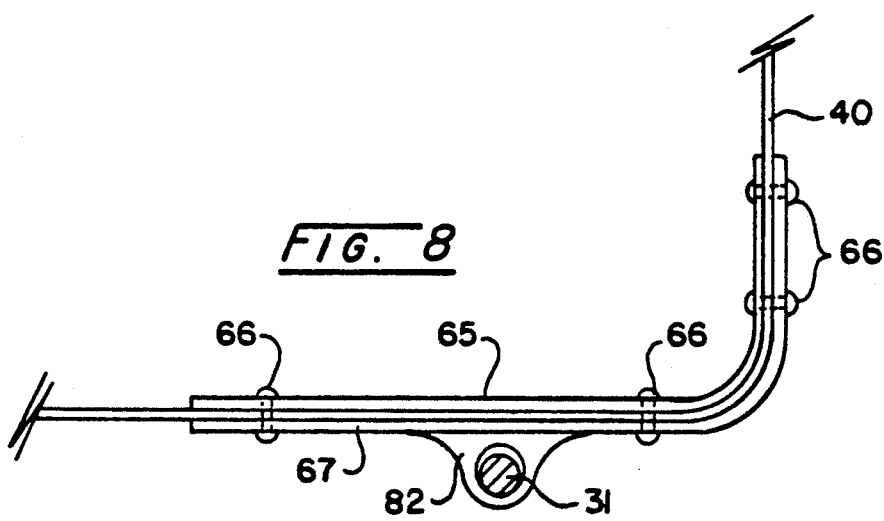

COOLER TOTE

BACKGROUND OF THE INVENTION

1. Field of the Invention

This invention relates generally to portable ice coolers or chests and, more particularly, to a detachable tote that permits easy wheeling of the cooler.

2. Description of the Prior Art

Several means for providing wheeled transport of portable coolers are described in the prior art. One such means is to include wheels as a permanent part of the cooler. Representative examples of this art include U.S. Pat. No. 4,873,841 to Bradshaw et al. which shows a cooler that has wheels permanently attached to one corner of the cooler with a handle on the opposite side for pulling the cooler. U.S. Pat. No. 4,846,493 to Mason describes a cooler with permanently attached retractable wheels and a handle for pulling the cooler. U.S. Pat. No. 4,724,681 to Bartholomew et al. reveals a cooler having a permanently attached wheel assembly and a handle that serves as a lock when the cooler is closed. Unfortunately such devices are of little consequence for the millions of coolers made without a wheeled transport means.

Another way of providing wheeled transport to cooler is to provide a nonintegral removable wheeling device. For example, U.S. Pat. No. 2,723,535 to Jones discloses a portable refreshment cooler configured for attachment to a wheeled golf cart. Such a design is directed toward a very small cooler designed for one or two items and does not have applicability to picnic coolers.

Detachable devices for wheeling luggage or duffle bags are also disclosed in the prior art. As representative examples of this art, U.S. Pat. No. 3,891,241 to Elsas shows a trolley that is attached to the corner of a suitcase by means of straps. U.S. Pat. No. 3,754,773 to Bruno describes two separate pairs of wheels that are each attached to a piece of luggage by means of a strap. U.S. Pat. No. 3,539,196 to Stiles discloses a pair of wheels attached to a duffle bag by means of a pair of straps. U.S. Pat. No. 2,696,990 to Davis reveals a bracket with a set of wheels that is attached to suitcase by means of a strap or belt. U.S. Pat. No. 2,670,969 to Costikyan depicts a luggage carrier harness for attaching a set of wheels to a piece of luggage. U.S. Pat. No. 2,365,338 to Alexander shows a set of wheels that is attached to a frame that is folded to conform to the corner of a piece of luggage and strapped to the luggage. Unfortunately such devices work poorly in the rugged environment in which most coolers are used.

All of the prior art means for providing wheeled transport to cooler have wheels that are permanently attached to the cooler or the cooler must be specifically constructed to be attached to a wheeling device that is designed for other purposes. The devices for providing wheeled portability to luggage do not address the problem of maintaining stability so as to prevent the cooler from slipping out of the straps and off the wheels and the cooler contents from spilling when used on surfaces that are not hard and smooth. These deficiencies are especially severe in view of the large numbers of coolers that have already been made without wheeled transport means and the rugged terrain in which coolers are usually used. Moreover coolers with attached wheels are expensive compared to existing coolers and are heavier, bulkier, and more difficult to load and unload from an automobile not to mention the extra space taken up by the wheels and resulting inconvenience of storage.

SUMMARY OF THE INVENTION

The present invention has solved these problems by providing a cooler tote that can be used with a wide variety of existing coolers without modification of the cooler. It is inexpensive, light weight, provides stability to the cooler when wheeled, and allows the cooler to be easily wheeled over irregular surfaces.

The invention consists of a means for supporting the cooler on at least two wheels, two or more straps that extend lengthwise around the bottom, ends and top of the cooler, a means for securing the straps to the cooler, and a means for securing the straps to the wheeled support means. In a simple form, the support means is just an axle on which the wheels are mounted and secured by means such as an axle nut or cotter pin. The straps are secured to the axle by means of an S-shaped fold in each strap in which the strap passes around the axle and returns to come in contact with itself. The strap is then folded or doubled back on itself to make contact with itself again. The strap is doubled back and redoubled back on itself so that the points of first and second contact align with each other. The strap is secured to itself at the points of contact using conventional fasteners such as rivets, clips, stitching, or adhesives.

In order to maintain the straps at a fixed distance from each other and from the wheels, concentric cylinders or ferrules may be slipped over the axle and placed among the wheels and straps. To further maintain the straps in fixed relations to each other, one or more cross straps are transversely attached to the straps that extend lengthwise around the cooler. To keep the wheel in fixed relation with the cooler, the interior surface of the straps can be coated with a nonslip substance so as to increase the friction between the strap and cooler.

Since the attachment of the lengthwise straps directly to the axle is likely to produce wear on the encircling S-folded strap, it is preferable to add a support member to eliminate the direct contact between the axle and the straps. In its simplest form, the support member may be a flat plate to which the axle is attached by convenient means and to which the straps are attached. For example, a cylindrical tube can be attached to the bottom of the plate and the axle rotatably passed through it. The straps may be cut in two with each end attached to opposite ends of the plate. To avoid cutting the straps, they can be interwoven through slots in the plate. The plate may be formed as a right angle that conforms to the corner of the cooler and, as a result, maintains the wheels in fixed relation with the cooler thereby preventing the wheels from slipping around to the side of the cooler, especially when rough terrain is encountered. The use of a single support member plate obviates the need for the axle spacer means to maintain the wheels and axles in fixed relation with each other.

Rather than using a single support plate, a multiple number of support plates can be used—one for each strap. Each plate is as wide as the strap and at least two of the plates are attached to the axle by suitable means such as an open cylinder attached to the bottom of the plate through which the axle passes. The plates can be formed in right angles, i.e., angle brackets, to fix the position of the wheels on the cooler as noted previously for single plate construction. The straps can be attached to the angle brackets by a variety of means including weaving the straps through a number of slots in the angle brackets or attaching the strap to the angle bracket with staples, adhesives or other conventional fasteners. The straps can also be attached to the angle bracket by means of a second angle bracket positioned so as to sandwich the strap between the first and second angle brackets. The strap is clamped between the first and second angle bracket by means of rivets, clips, adhesives or other suitable fastening means.

In order to negotiate rocky or uneven terrain the diameter of the wheels should be at least 1/5th (20%) of the height of the cooler. A handle can be attached to the straps to conveniently pull the cooler in a level position. The handle can be nothing more than a long cross strap sewn to the cooler straps. Alternatively, the handle can be fastened to the cooler straps with buckles in order to adjust the height of the handle to accommodate different sized coolers and to avoid interference with the original cooler handles which may be used to lift the cooler onto a picnic table or into the car. An open cylinder may be slipped over the strap to provide a more comfortable grip. Of course other versions of handles can be attached to the cooler straps in a variety of ways. A buckle can be provided for the handle strap to adjust its length.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

BRIEF DESCRIPTION OF THE DRAWINGS

FIG. 7 is a cross sectional view through 3—3 of FIG. 2 of another embodiment for attaching the straps to the axle.

FIG. 8 is a cross sectional view of a third embodiment for attaching the straps to the axle.

Figure 1:
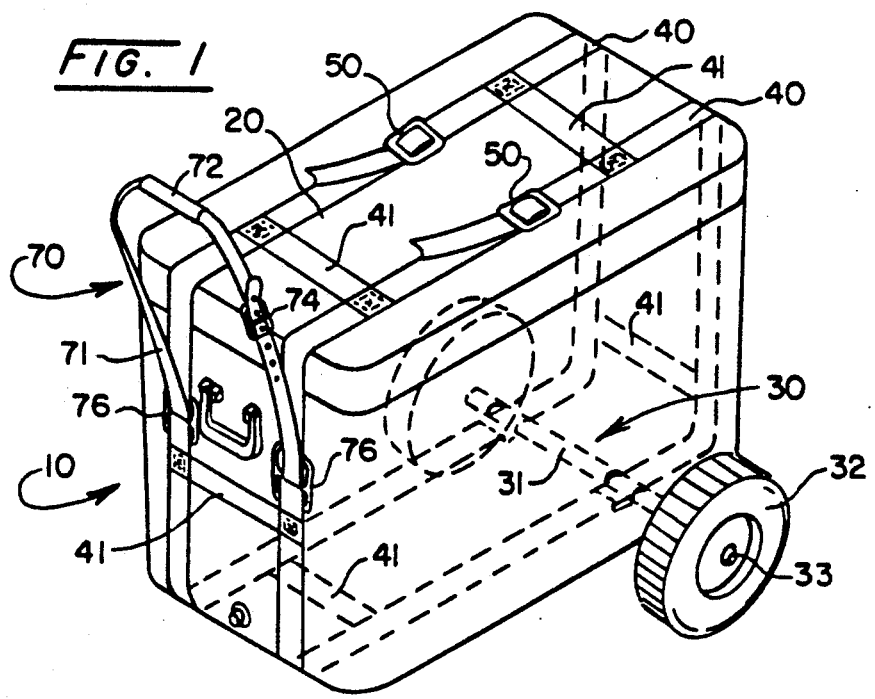
FIG. 1 is a an isometric view of the cooler tote of this invention as used with a portable cooler.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalence thereof.

DETAILED DESCRIPTION OF THE INVENTION AND BEST MODE FOR CARRYING OUT THE PREFERRED EMBODIMENT

Figure 6:
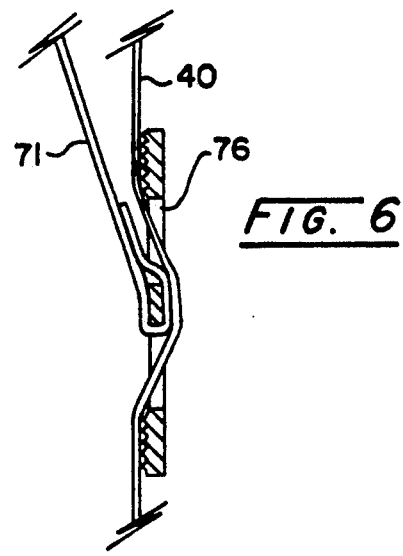
FIG. 6 is a partial cross sectional side view of a buckle for attaching the tote handle straps to the cooler straps.

A cooler tote 10 is shown in FIG. 1 and consists of a support means 30 for cooler 20, straps 40, a means for securing the straps 40 to cooler 20, and a means 60 (FIG. 3) for securing straps 40 to support means 30. The support means 30 consists of wheels 32 and an axle 31 with the wheels 32 being held on the axle 31 by suitable means such as the axle nut 33. The wheels 32 should be of substantial width and have a diameter that is at least 20% (1/5) the height of the cooler 20 so as to allow the cooler 20 to be wheeled over rocks, ruts, curbs and other rough terrain without becoming stuck or otherwise causing the cooler 20 to tip over or become disengaged from straps 40. Cross straps 41 keep the straps 40 in fixed relation with each other and are sewn or otherwise conveniently attached to straps 40. A handle assembly 70 consists of a handle strap 71, a handle 72, a buckle 74 for adjusting the length of the handle strap 71 and buckles 76 for attaching the handle strap 71 to the straps 40. The method of attachment of handle strap 71 to strap 40 by means of buckle 76 is further detailed in FIG. 6.

Figure 2:
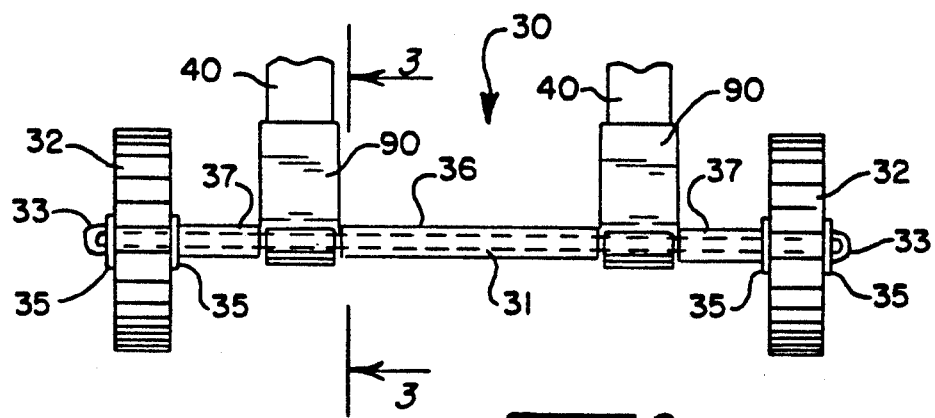
FIG. 2 is a detailed front view of the cooler support means 30 of FIG. 1.

FIG. 2 illustrates a support means 30 that consists of an axle 31, wheels 32 attached to the axle, and a means such as an axle nut 33 for securing the wheels 32 to the axle 31. Ferrules 36 and 37 are slipped over 31 to maintain the straps 40 and wheels 32 in fixed spacial relation with each other. Alternatively the axle 31 may be made of an enlarged diameter stock with the ends and intermediate sections along the axle 31 having a reduced diameter to accommodate the wheels 32 and to serve as a positioning means for the straps 40. Washers 35 are provided to prevent undue wear and friction with the axle nuts 33 and the ferrules 37 or, alternatively with the shoulder formed in going from the enlarged to reduced portion of axle 31.

Figure 3:
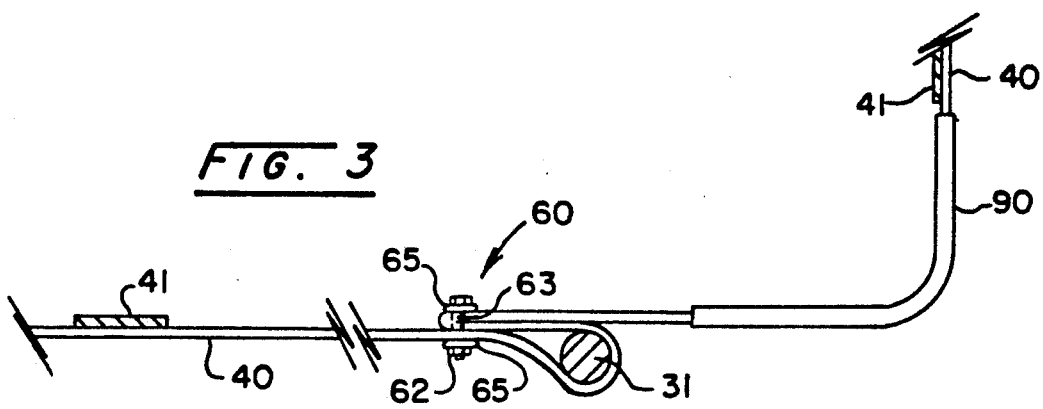
FIG. 3 is a cross sectional view through 3—3 of FIG. 2 showing an embodiment for the attachment of the straps to the axle.

FIG. 3 further illustrates a means 60 for securing the straps 40 to the axle 31 of the support means 30. Strap 40 is folded to form an S-shaped fold around axle 31. Strap 40 passes under axle 31 and then up and around axle 31 to make contact with itself. Strap 40 then doubles back on itself again to make a second contact with itself. The points of first and second contact are formed so as to be in alignment with each other and are secured to each other by suitable means such as nut 62, bolt 63, and washers 65. Straps 40 can be provided with a non-slip coating. Alternatively, a rigid piece of material 90 attached to strap 40 and formed in a right angle so as to conform to the corner of the cooler 20 can be used to maintain the wheels and cooler in fixed relation with each other and thereby prevent the wheels 32 and axle 31 from slipping around the bottom corner of cooler 20.

Rather than folding straps 40 about axle 31 in an S-shaped fashion as shown in FIG. 3, an angle bracket 67, such as shown in FIG. 7, can be used for attaching the straps 40 to the axle 31. The angle bracket 67 is about the same width as strap 40 with one angle bracket 67 being used for each strap 40. The width and location of the angle brackets 67 can be visualized by referring to FIG. 2 and substituting angle bracket 67 for the rigid angle material 90. Strap 40 can be secured to angle bracket 67 by passing it through transverse slots 69 in angle bracket 67 in serpentine fashion. Angle bracket 67 has an apertured member 82 on its underside through which axle 31 rotatably passes.

FIG. 8 illustrates a different method for attaching angled bracket 67 to strap 40. In FIG. 8, strap 40 is sandwiched or clamped between angle brackets 67 and a second angle bracket 65 by means of a suitable fastener such as a rivet 66.

Figure 4:
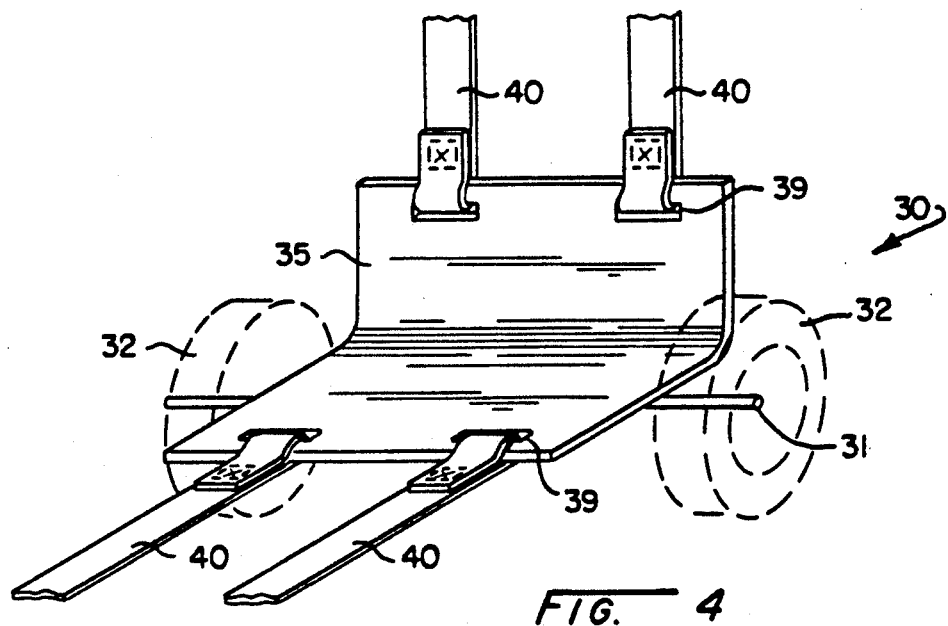
FIG. 4 is an isometric view of another embodiment of the cooler support means 30.
Figure 5:
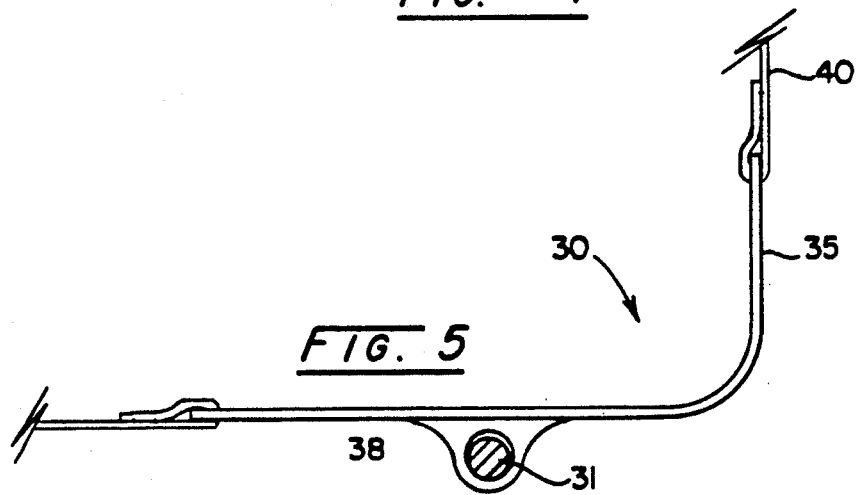
FIG. 5 is a partial cross sectional side view of the cooler support means 30 of FIG. 4.

Another embodiment of support means 30 is shown in FIGS. 4 and 5. Support member 35 is formed so as to conform to the lower corner of cooler 20. Straps 40 are cut and attached to support member 35 by means of slots 39 through which the cut ends of straps 40 pass and are folded over and attached to themselves by suitable means such as by stitching, gluing, riveting, etc. Axle 31 is held in place by aperture member 38 which may be a cylinder rigidly attached to support member 35 and through which axle 31 rotatably passes. Support member 35 and aperture member 38 may be formed as one piece.

It is possible that changes in configurations to other than those shown could be used but that which is shown if preferred and typical. Without departing from the spirit of this invention, various means of fastening the components together may be used.

It is therefore understood that although the present invention has been specifically disclosed with the preferred embodiment and examples, modifications to the design concerning sizing and shape may be apparent to those skilled in the art and such modifications and variations are considered to be within the scope of the invention and the appended claims.

I claim:

1. In combination, a portable ice cooler and a detachable wheeled transport device therefor comprising:
   a portable ice cooler having a top wall, a bottom wall, side walls, and end walls;
   detachable support means for said cooler comprising two wheels supported on an axle for supporting a rearward portion of said cooler;
   a pair of laterally spaced-apart straps extending lengthwise around the top, bottom, and end walls of said cooler in a direction of travel of said cooler;
   means for securing said pair of straps to said support means;
   means for securing said pair of straps to said cooler;
   a handle strap for pulling said cooler in an essentially level position, said handle strap having a pair of free ends; and
   means for attaching said handle strap to said pair of straps, said means for attaching including a pair of buckles slidably attached to respective ones of said pair of straps along a forward end wall of the cooler, each buckle having a pair of slots through which a respective one of said pair of straps is woven therethrough, means on each buckle for securing a respective free end of said handle strap thereto, and means on each buckle for preventing sliding movement of the buckle relative to the respective one of said pair of straps when the handle strap is being pulled by a user.

2. The detachable wheeled transport device according to claim 1 with said means for securing said straps to said support means comprising:
   (a) an S-shaped fold in each strap wherein said strap passes around said axle and makes a first contact with itself and then doubles back to make a second contact with itself with said first and second contacts being in alignment with each other; and
   (b) a means for joining said strap to itself at the point of alignment of said first and said second contacts.

3. The detachable wheeled transport device according to claim 2 wherein said means for joining said strap to itself is a rivet.

4. The detachable wheeled transport device according to claim 2 wherein said means for joining said strap to itself is stitching.

5. The detachable wheeled transport device according to claim 2 wherein said means for joining said strap to itself is an adhesive.

6. The detachable wheeled transport device according to claim 2 further comprising a spacer placed on said axle to maintain said straps at a fixed distance from each other and from said wheels.

7. The detachable wheeled transport device for coolers according to claim 6 wherein said spacer is a ferrule.

8. The detachable wheeled transport device according to claim 1 further comprising an axle nut for securing said wheels on said axle.

9. The detachable wheeled transport device according to claim 1 wherein said support means further comprises a support member and an open cylinder attached to said support member through which said axle passes.

10. The detachable wheeled transport device according to claim 1 wherein said support means further comprises a support member and means for attaching said axle to said support member, said means for attaching said axle to said support member being an integral part of said support member.

11. The, detachable wheeled transport device according to claim 1 with said means for securing each strap of said pair of straps to said support means comprising:
    (a) a pair of first angle brackets;
    (b) a means for attaching each of said first angle brackets to said axle; and
    (c) a means for attaching each of said first angle brackets to each of said pair of straps.

12. The detachable wheeled transport device according to claim 11 with said means for attaching each of said straps to each of said first angle brackets comprising weaving each of said straps through a plurality of slots in each of said first angle brackets.

13. The detachable wheeled transport device according to claim 11 wherein said means for attaching each of said straps to each said first angle brackets is a rivet.

14. The detachable wheeled transport device according to claim 11 wherein said means for attaching each of said straps to each of said angle brackets is an adhesive.

15. The detachable wheeled transport device according to claim 11 with said means for attaching each of said first angle brackets to each of said pair of straps comprising:
    (a) a second angle bracket conforming in shape to said first angle bracket and positioned so as to sandwich said strap between said first and said second angle bracket; and
    (b) means for securing said strap to said first and said second angle brackets.

16. The wheeled transport device according to claim 15 wherein said means for securing said strap to said first angle bracket and to said second angle bracket is a rivet.

17. The detachable wheeled transport device according to claim 1 further comprising means for securing said straps to each other.

18. The detachable wheeled transport device according to claim 17 wherein said means for securing said straps to each other is at least one cross strap.

19. The detachable wheeled transport device according to claim 1 wherein the diameter of said wheels is more than about 1/5 the height of said cooler.

20. The detachable wheeled transport device according to claim 1 wherein said means for securing said straps to said cooler is a buckle.

21. The detachable wheeled transport device according to claim 1 further comprising a means for maintaining said support means in fixed relation with said cooler.

22. The detachable wheeled transport device according to claim 21 wherein said means for maintaining said support means in a fixed relation with said cooler is an angle bracket attached to each said strap and conforming to a lower corner edge of said cooler where said strap passes around said cooler.

23. The detachable wheeled transport device according to claim 21 wherein said means for maintaining said support means in a fixed relation with said cooler is a coating applied to said straps.

* * * * *